United States Patent
Choi et al.

(10) Patent No.: US 10,298,879 B2
(45) Date of Patent: May 21, 2019

(54) METHOD AND SYSTEM FOR SWITCHING A PUSH-BASED VIDEO CALL BETWEEN DEVICES IN A GROUP

(71) Applicant: Kyung Dong One Corporation, Seoul (KR)

(72) Inventors: Sin Dae Choi, Seoul (KR); Wang Ki Lee, Seoul (KR)

(73) Assignee: Kyung Dong One Corporation, Seoul (KR)

( * ) Notice: Subject to any disclaimer, the term of this patent is extended or adjusted under 35 U.S.C. 154(b) by 127 days.

(21) Appl. No.: 15/415,394

(22) Filed: Jan. 25, 2017

(65) Prior Publication Data

US 2017/0214886 A1    Jul. 27, 2017

(30) Foreign Application Priority Data

Jan. 26, 2016  (KR) ................. 10-2016-0009482

(51) Int. Cl.
*H04N 7/14* (2006.01)
*H04L 12/18* (2006.01)
*H04L 29/06* (2006.01)
*H04N 7/15* (2006.01)

(52) U.S. Cl.
CPC .......... *H04N 7/147* (2013.01); *H04L 12/185* (2013.01); *H04L 65/4061* (2013.01); *H04N 7/15* (2013.01)

(58) Field of Classification Search
CPC .............................. H04L 12/185; H04L 67/26
USPC .................... 348/14.01–14.16; 370/259–271, 370/351–357; 709/201–207, 217–248
See application file for complete search history.

(56) References Cited

U.S. PATENT DOCUMENTS

| 2009/0285131 | A1* | 11/2009 | Knaz | H04M 3/56 370/260 |
| 2012/0023167 | A1* | 1/2012 | Hovdal | G06K 7/1095 709/204 |
| 2013/0314491 | A1* | 11/2013 | Vivekanandan | H04M 3/567 348/14.08 |

(Continued)

FOREIGN PATENT DOCUMENTS

| KR | 10-2008-0053001 A | 6/2008 |
| KR | 10-2012-0017555 A | 2/2012 |
| KR | 10-1380608 B1 | 4/2014 |

*Primary Examiner* — Hemant S Patel (74) *Attorney, Agent, or Firm* — Mintz Levin Cohn Ferris Glovsky and Popeo, P.C.; Kongsik Kim; Derek E. Constantine (57) ABSTRACT

Methods, devices, and systems are provided herein related to a connection management server connected to a signaling server, a push server, at least one home device, and at least two smart devices. The connection management server includes a connection management request receiver for receiving a video call connection request or a user switching request. A connection management request transmitter is also included for transmitting a connection state releasing request to the home device and the first smart device, for transmitting a video call push notification transmission request to the push server upon the video call connection request, and for transmitting a user switching push notification transmission request to the push server upon the user switching request. A group manager is also included for managing, in a group, smart device identity corresponding to a push notification sent from the push server.

5 Claims, 5 Drawing Sheets

(56) References Cited

U.S. PATENT DOCUMENTS

2014/0087705 A1* 3/2014 Wooster ............... H04B 5/0031
455/416
2016/0164694 A1* 6/2016 Hyun ...................... H04L 12/12
348/14.08

* cited by examiner

METHOD AND SYSTEM FOR SWITCHING A PUSH-BASED VIDEO CALL BETWEEN DEVICES IN A GROUP

CROSS-REFERENCE TO RELATED APPLICATIONS

This patent application claims priority to Korean Patent Application No.10-2016-0009482, filed on Jan. 26, 2016, the disclosure of which is incorporated by reference herein in its entirety.

TECHNICAL FIELD

The present disclosure relates to a connection management server and a connection management method for switching a push-based video call between devices in a group.

BACKGROUND

The widespread use of home automation has led to the growth of technology for home device control systems capable of indoor or outdoor control of various home devices and video call through the screen of a smart device.

Multiple home automation devices, e.g., door phones, lobby phones, or video phones, and home network app-installed smart devices can be connected to a smart device-based home device control system. If a push server sends wakeup signals and device information to all the smart devices located within a predetermined range, one of the smart devices will wake up to drive its home network app and inform the video phone corresponding to the IP address contained in the device information that the smart phone has received the wakeup signal to establish a session between the smart device and the video phone.

However, such conventional home device-smart device video calling accounts are only effective for one-to-one connection between a smart device and a home device, lacking the ability to switch a video call session once established between a home device and a smart device receiving a push notification over to another smart device. There thus remains a need for improved operations, especially in the usage of smart devices under today's home automation environments where a number of smart devices within the same area may be bundled up in a single group.

SUMMARY

Provided herein is a connection management server and a connection management method for switching a push-based video call between devices in a group, and more particularly, a connection management server and a connection management method for switching a push-based video call between devices in a group.

According to an embodiment, a connection management server for switching a push-based video call between devices in a group, the connection management server connected to a signaling server, a push server, at least one home device, and at least two smart devices, includes a connection management request receiver configured to receive a video call connection request or a user switching request from the home device and a first smart device of the at least two smart devices. The server also includes a connection management request transmitter configured to transmit a connection state releasing request to the home device and the first smart device. It can also be configured to transmit a video call push notification transmission request to the push server upon the video call connection request, and it can be configured to transmit a user switching push notification transmission request to the push server upon the user switching request. The server also includes a group manager that is configured to manage, in a group, smart device identity (ID) corresponding to a push notification sent from the push server.

The server can have numerous variations. For example, upon receiving the user switching request from the home device and the first smart device, a smart device ID of a second smart device of the at least two smart devices where a new video call connection is established can be received. Upon receiving the smart device ID, the push server can transmit a push notification to a group including the at least two smart devices having the smart device ID. Upon receiving the smart device ID, the push server can transmit a push notification to a smart device having the smart device ID.

According to another embodiment, a method of switching a push-based video call between devices in a group in a connection management server connected to a signaling server, a push server, at least one home device, and at least two smart devices, includes receiving, by the connection management server, a user switching request from one of the home device and a first smart device of the at least two smart devices between which a video call connection is established. The method also includes transmitting a user switching push notification transmission request to the push server in response to receiving the user switching request, and the method includes receiving a user switching response from a second smart device of the at least two smart devices. The method also includes transmitting a connection releasing request to the home device and the first smart device in response to receiving the user switching response.

The method can have numerous variations. For example, the method can include receiving, by the connection management server, a smart device ID of the second smart device from the device transmitting the user switching request. The method can also include requesting, by the connection management server, the push server to transmit a push notification to a group including at least two smart devices having the smart device ID. In another example, the method can include requesting, by the connection management server, the push server to transmit a push notification to a smart device having the smart device ID.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Hereinafter, exemplary embodiments of the present disclosure will be described in detail with reference to the accompanying drawings. The same reference denotations may be used to refer to the same or similar elements throughout the specification and the drawings. The present disclosure, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Various methods, devices, and systems are provided, including a connection management system and method for switching a push-based video call between devices in a group.

Figure 1:
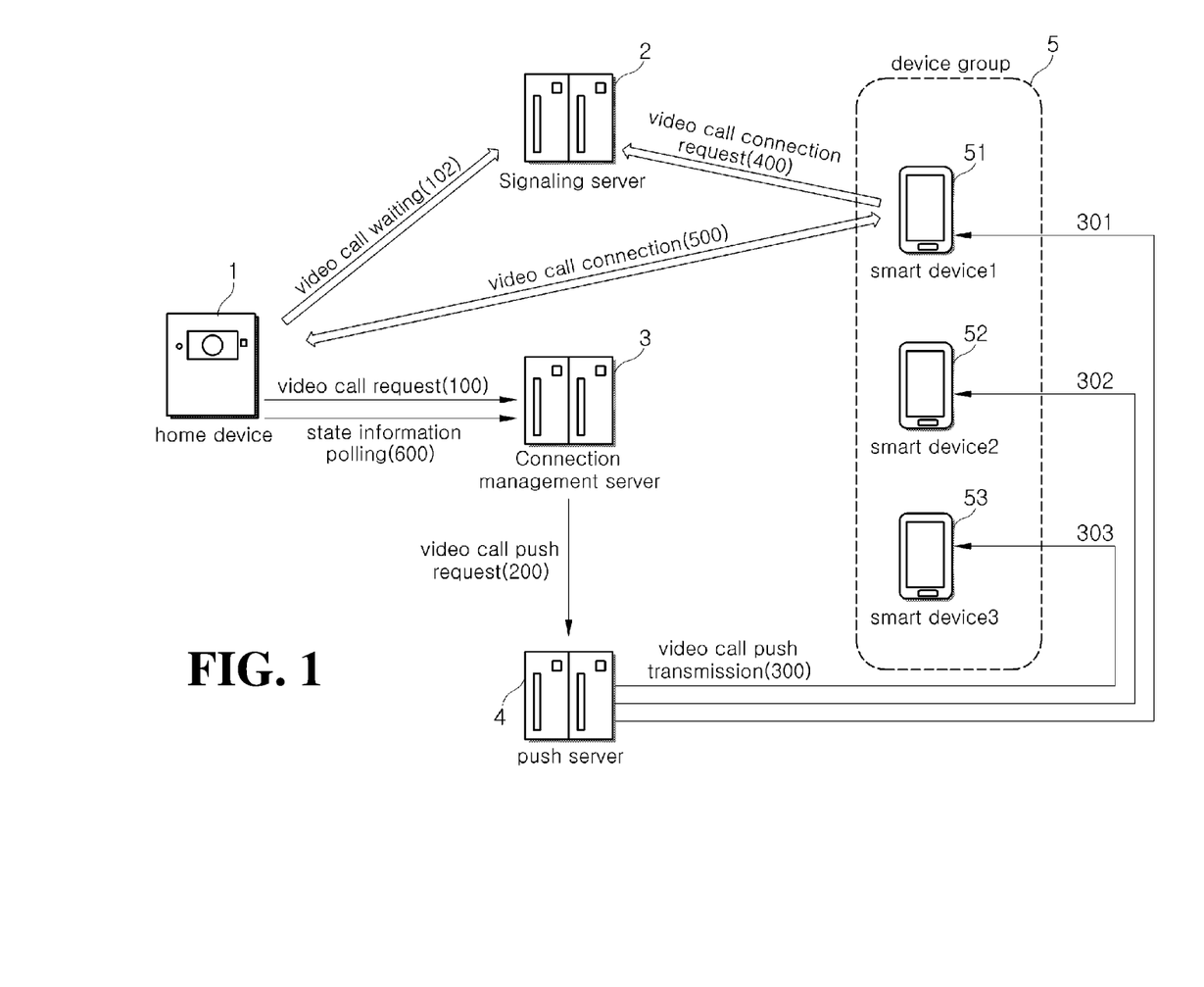
FIG. 1 is a view illustrating an example of a system providing a video call connection between a home device and a specific smart device in a push-based video call environment including a home device and a plurality of smart devices.

FIG. 1 illustrates an example of a system providing a video call connection between a home device and a specific smart device in a push-based video call environment, including a home device and a plurality of smart devices according to one embodiment. As illustrated in FIG. 1, a system providing a video call connection between a home device and a specific smart device under a push-based video call environment can include a signaling server 2, a connection management server 3, and a push server 4. The signaling server 2, the connection management server 3, and the push server 4 can be connected with a least one home device 1 and one or more smart devices 51, 52, 53.

The home device 1 of FIG. 1 can include a device able to perform a push-based video call. For example, the home device 1 can include a door phone, a lobby phone, or a video phone that can perform a video call. Each of the smart devices 51, 52, 53 can be, for example, a smart phone or a tablet PC with an application for performing a video call install therein. The signaling server 2 can establish signaling for exchanging video and audio data between the home device 1 and the smart devices 51, 52, 53. The signaling server 2 can be a server exchanging metadata for adjusting communication between clients, e.g., the home device 1 and the smart devices 51, 52, 53.

According to some embodiments as shown in FIG. 1, a video call between the home device and the smart devices can be performed based on Web Real-Time Communication (WebRTC) and/or Session Initiation Protocol (SIP). The signaling server 2 can provide information regarding a target device, to which a video call is connected, to the home device 1 and each of the smart devices 51, 52, 53. The information about the target device for connection can include a variety of information, e.g., an IP address and a port number. For an application to initialize a "call" under WebRTC, a client can exchange information as follows: session control messages used for opening and closing a communication; error messages; media metadata, such as media type, bandwidth, codec, and/or codec settings; key data used for establishing a secure connection; and/or network data, such as an IP address and port number of a host.

SIP is a signaling protocol used in Voice over Internet Protocol (VoIP) or video conference systems. For communicating between a SIP client, such as a video conference system, and a WebRTC web application (or "app"), WebRTC can use a proxy server intermediating for signaling. Signaling can be transferred through a gateway, but once communication is established, SRTP traffic (such as video and audio) can be transferred directly in a peer-to-peer manner. The connection management server 3 can be a device for managing a call connection state between the home device 1 and the smart devices 51, 52, 53. The connection management server 3 can periodically communicate state information with the home device 1.

The connection management server 3 can transmit a push-request to the push server 4 to enable the push server 4 to send push notifications to the smart devices 51, 52, 53. The smart devices 51, 52, 53 can receive the push notifications from the push server 4 to make a determination about a call connection. The connection management server 3 can form a control channel with the home device 1 and the smart device 51, 52, and/or 53 to perform communication with such devices. The push server 4 can send a push notification to the home device 1 and/or the smart devices 51, 52, 53, in response to a request by the connection management server 3.

According to some embodiments as shown in FIG. 1, the smart devices 51, 52, 53 can be bundled and managed in a common device group 5. Push notifications including the same content can be sent to the smart devices 51, 52, 53 bundled and managed in the common device group 5.

In some examples, such as that illustrated in FIG. 1, a process can be provided for connecting a video call between the home device 1 and a specific smart device 51 in the system, providing a video call connection between a home device and a specific smart device under a push-based video call environment. In a first step for connecting a video call, the home device 1 can send a video call request 100 to the connection management server 3. The home device 1 can connect to the signaling server 2 to provide its own meta information, e.g., IP address and port number, and then it can enter into a state of call waiting 102. The home device 1 can include its own smart device identity (ID) (also referred to herein as a "home device ID") in the meta information provided to the signaling server 2. The smart device ID can be used as basis for determining whether or not to permit connection of the video call.

Upon receiving the video call request 100 from the home device 1, the connection management server 3 can transmit a video call push request 200 to the push server 4 for transmitting a video call push to a target device capable of making a video call with the home device 1. In response to the video call push request from the connection management server 3, the push server 4 can then send a video call push 300 to a video call-capable target device(s). In some embodiment such as that in FIG. 1, the video call-capable target devices can be the smart devices 51, 52, 53 bundled and managed in a device group 5, and thus, the push server 4 can transmit video call pushes 301, 302, 303, respectively, to a first smart device 51, a second smart device 52, and a third smart device 53.

As illustrated in FIG. 1, the first smart device 51 can send a request for a video call connection 400 to the signaling server 2 in response to the video call push transmission. Because the home device 1 has already provided its own meta information to the signaling server 2 and is in a video call waiting state, the first smart device 51 can form a video communication channel with the home device 1 based on the meta information of the home device 1 provided from the signaling server 2 (500). Once the video communication channel with the home device 1 is established, video call data can be exchanged between the home device 1 and the first smart device 51 in a peer-to-peer manner.

The home device 1 can perform polling on the connection management server 3 by providing its state information to the connection management server 3 so that the connection management server 3 can update the state of the video call connection. "Polling" is a transmission control technique that enables a program or device to continuously check for the state of another program or device, meaning, e.g., a process for checking whether the other party is still in connection and desires data transmission. Although three smart devices 51, 52, 53 are shown in the embodiment of FIG. 1, there can be any number of smart devices. The embodiment in FIG. 1 is merely an example for indicating that one or more or a plurality of smart devices are connected. The number of smart devices connected is not specifically limited throughout the specification as long as it is within a technically possible range.

Figure 2:
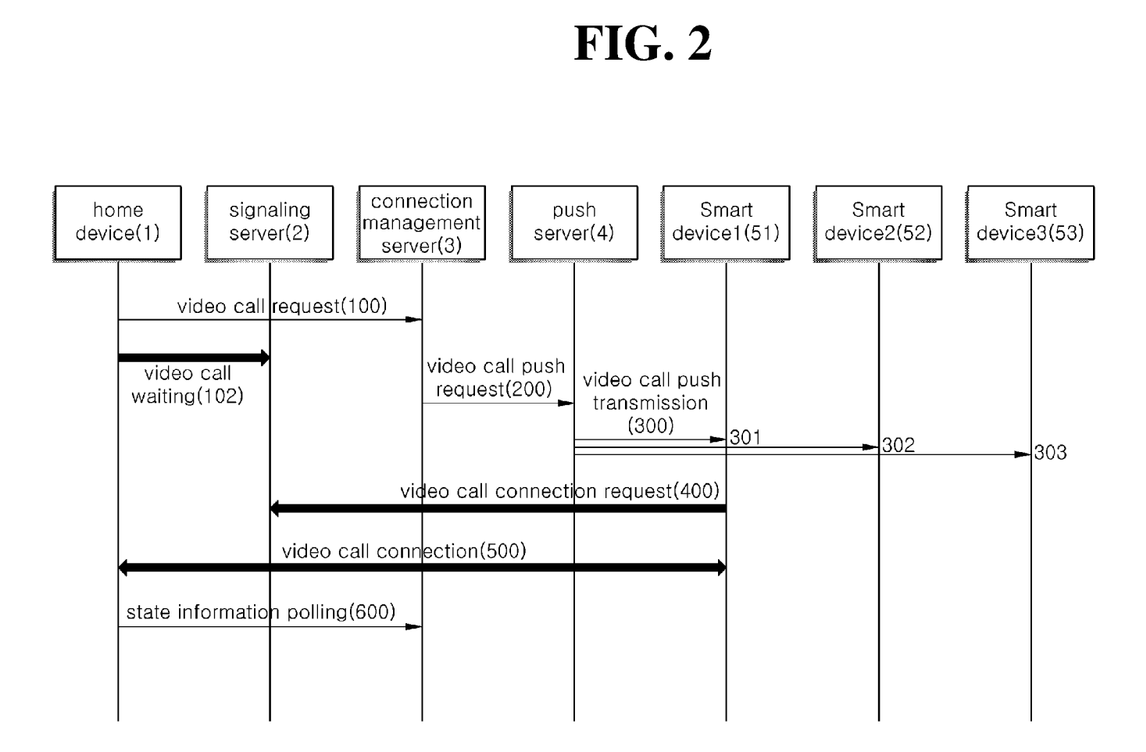
FIG. 2 is flowchart illustrating an example of a method of establishing a video call connection between a home device and a specific smart device in a system as shown in FIG. 1.

FIG. 2 is a flowchart illustrating an example of a method of establishing a video call connection between a home device and a specific smart device in a system, such as the system shown in FIG. 1. Referring to FIG. 2, the steps for the video call connection are distinctively shown per entity of the system illustrated in FIG. 1 to provide a better understanding of what actions each entity performs specifically. The processes denoted with the same reference number in FIGS. 1 and 2 can refer to the same process. For example, the entity can be one of the components 1, 2, 3, 4, 51, 52, and 53 of the system of FIG. 1.

As illustrated in FIG. 2, a home device 1 can transmit a video call request to a connection management server 3 (100). The home device 1 can connect to a signaling server 2 and can provide its own meta information, e.g., IP address and port number, to the signaling server 2 before entering a call waiting state 102. Upon receiving the video call request 100 from the home device 1, the connection management server 3 can transmit a video call push request to a push server 4 (200). The video call push request can be made to send a video call push to a target device to perform a video call with the home device 1. In response to the video call push request from the connection management server 3, the push server 4 can send video call push(s) to a target device or target devices capable of making a video call (300). The video call-capable target devices can be smart devices 51, 52, 53 bundled and managed in a device group 5, and thus, the push server 4 can transmit video call pushes 301, 302, 303, respectively, to the first smart device 51, the second smart device 52, and the third smart device 53.

When the first smart device 51 makes a video call connection with the home device 1, the first smart phone 51 can send a request for a video call to the signaling server 2 in response to the video call push transmission (400). Because the home device 1 has already provided its own meta information to the signaling server 2 and is in the video call waiting state, the first smart device 51 can form a video communication channel with the home device 1 based on the meta information of the home device provided from the signaling server 2 (500).

Once the video communication channel with the home device 1 is established, video communication data can be exchanged between the home device 1 and the first smart device 51 in a peer-to-peer manner. The home device 1 can perform polling on the connection management server 3 by providing its own state information to the connection management server 3.

Figure 3:
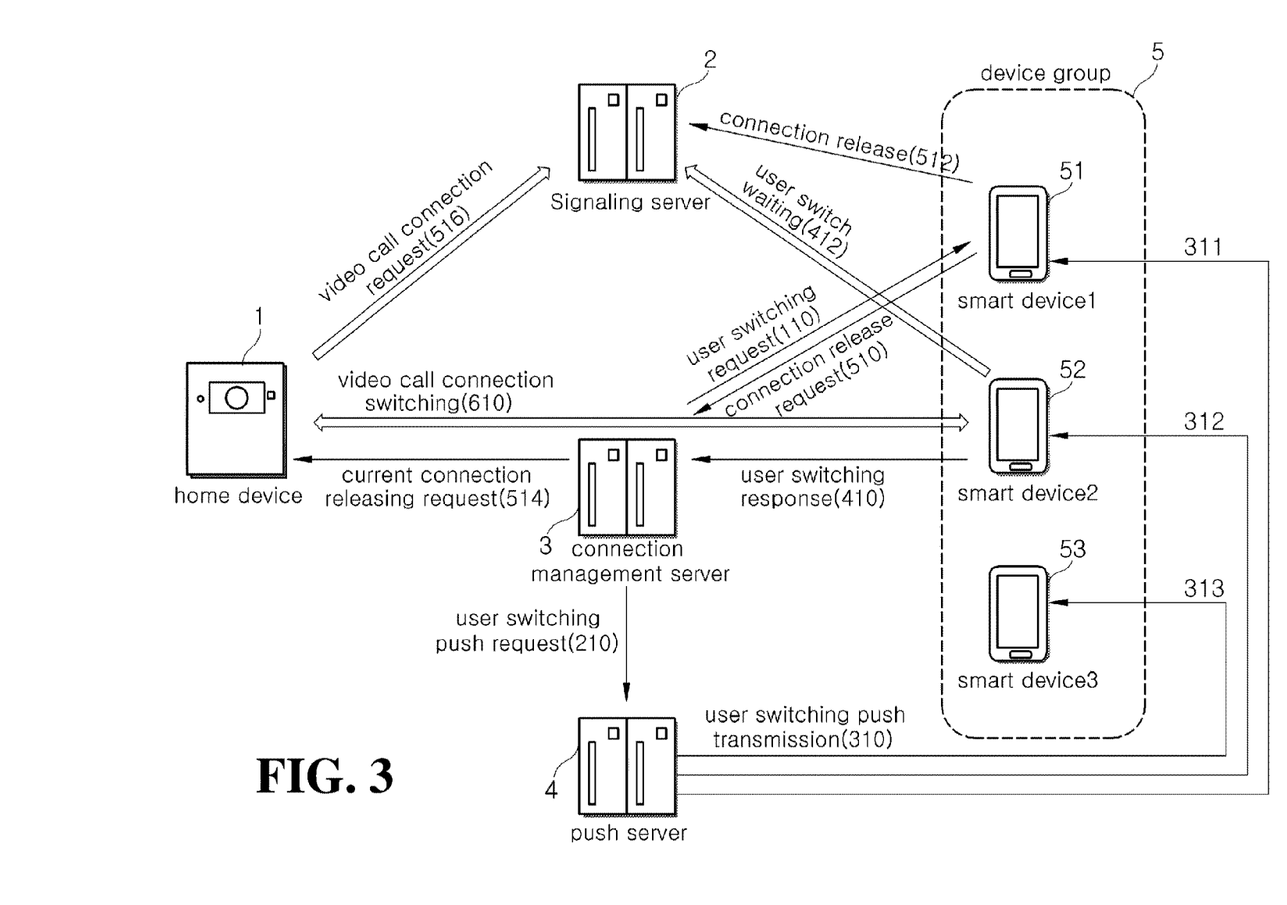
FIG. 3 is a view illustrating an example of a process for switching a video call connection between a home device and a specific smart device to another smart device in a system as shown in FIG. 1.

FIG. 3 illustrates an example of a process for switching a video call connection between a home device and a specific smart device to another smart device in a system, such as that shown in FIG. 1. In various embodiments, such as that illustrated in FIG. 3, a process can be provided for switching a video call connection between the home device 1 and the first smart device 51 to a video call connection between the home device 1 and the second smart device 52 in the system providing a video call connection between a home device and a specific smart device. A video call connection is formed between the home device 1 and the first smart device (500), such as by following the steps provided above with reference to FIGS. 1 and 2. Once the connection is established, the first smart device 51 can transmit a user switching request 110 to the connection management server 3. The user switching request can be a request that a device leave the video call connection currently established and another device take over the connection.

The first smart device 51 can include a smart device ID of a smart device to be substituted after switching, e.g., a smart device ID of the second smart device 52, in the meta information provided to the connection management server 3. The smart device ID can be used as a basis for determining who will be allowed to make the video call connection. In response to the user switching request, the connection management server 3 can transmit a user switching push request 210 to the push server 4. Target devices capable of making a video call can be the smart devices 51, 52, 53 bundled and managed in a device group 5, and thus, the push server 4 can transmit user switching pushes 311, 312, 313, respectively, to the first smart device 51, the second smart device 52, and the third smart device 53.

Because the first smart device 51 currently has the video call connection, it can be preferable to prevent the first smart device 51 from receiving the user switching push 313. In this case, when the connection management server 3 sends the user switching push request 210 to the push server 4, the connection management server 3 can include information regarding the second smart device 52 and the third device 53, except information about the first smart device 51, in the user switching push request 210 so as to prevent a user switching push 311 from being sent to the first smart device 51 that has transmitted the user switching request. In another example, when the connection management server 3 receives a smart ID of the second smart device 52 to be connected to a new video call connection from the first smart device 51, the connection management server 3 can enable the push server 4 to transmit the user switching push 312 only to the second smart device 52.

The second smart device 52, upon making a video call connection with the home device 1, can transmit a user switching response to the connection management server 3 in response to the user switching push 312 (410). Upon the user switching response, the connection management server 3 can recognize the appearance of a device desiring a switch of the video call connection and can perform a process of releasing the existing connection. The second smart device 52 can connect to the signaling server 2 to provide its own meta information, e.g., IP address and port number, and then can enter a user switch waiting state (412). Because the connection management server 3 receives the user switching response from the second smart device 52, the connection management server 3 can transmit a connection releasing request 510 to the first smart device 51 (510). The first smart device 51 can then release the connection with the home device 1 so that another smart device, e.g., the second smart device 52, can take over the video call connection (512).

The connection management server 3 can also transmit a current connection releasing request 514 to the home device 1, which is a counterpart request of the video call connection with the first smart device 51 (514). Because the connection has already been released by the releasing operation of the first smart device 51, the home device 1 can send a request for a video call connection switch to the signaling server 2 (516). Because the second smart device 52 has already provided its own meta information to the signaling server 2 and is in the video call waiting state, the home device 1 can perform a new video call channel based on the meta information of the second smart device 52 received from the signaling server 2 (610). In this sequence, the home device 1 can complete the process of switching the video call channel with the first smart device 51 into a video call with the second smart device 52.

Figure 4:
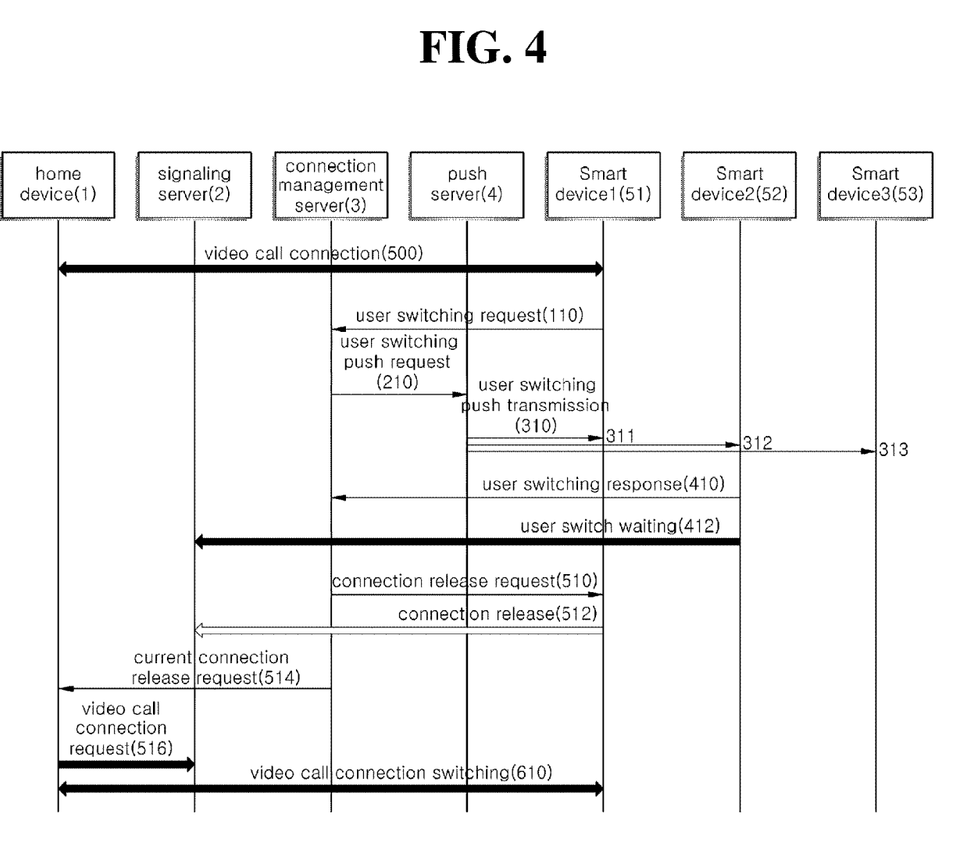
FIG. 4 is a flowchart illustrating an example of a process for switching a video call connection between a home device and a specific smart device to another smart device as illustrated in FIG. 3.

FIG. 4 is a flowchart illustrating an example of a process for switching a video call connection between a home device and a specific smart device to another smart device according to an embodiment such as that illustrated in FIG. 3. As illustrated in FIG. 4, the steps of a video call connection are distinctively shown per entity of a system, such as the system illustrated in FIG. 1, for a clearer understanding of what actions each entity specifically performs. The processes denoted with the same reference number in FIGS. 3 and 4 can refer to the same process.

As illustrated in FIG. 4, when the first smart device 51 wants to end the video call connection 500 currently established, the first smart device 51 can transmit a user switching request 110 to the connection management server 3. The first smart device 51 can include a smart device ID of a smart device to be substituted after switch, e.g., a smart device ID of the second smart device 52, in the meta information provided to the signaling server 2. The smart device ID can be used as a basis for determining who is allowed the video call connection.

In response to the user switching request, the connection management server 3 can transmit a user switching push request 210 to the push server 4. Target devices capable of making a video call can be the smart devices 51, 52, 53 bundled and managed in a device group 5, and thus, the push server 4 can transmit user switching pushes 311, 312, 313, respectively, to the first smart device 51, the second smart device 52, and the third smart device 53. When the second smart device 52 makes a video call connection with the home device 1, the second smart device 52 can transmit a user switching response 410 to the connection management server 3 in response with the user switching push 312 (410). Upon the user switching response, the connection management server 3 can recognize that the appearance of a device desiring a switch of the video call connection and can perform a process for releasing the existing connection.

The second smart device 52 can connect to the signaling server 2 to provide its own meta information, e.g., IP address and port number, and then can enter a user switch waiting state (412). Because the connection management server 3 receives the user switching response from the second smart device 52, the connection management server 3 can transmit a connection releasing request 510 to the first smart device 51. The first smart device 51 can release the connection with the home device 1 so that another smart device, e.g., the second smart device 52, can take over the video call connection (512).

The connection management server 3 can also transmit a current connection releasing request 514 to the home device 1, which is a counterpart request of the video call connection (514). Because the connection has already been released by the releasing operation of the first smart device 51, the home device 1 can send a request for a video call connection switch to the signaling server 2 (516). Because the second smart device 52 has already provided its own meta information to the signaling server 2 and is in the video call waiting state, the home device 1 can form a new video call channel based on the meta information of the second smart device 52 received from the signaling server 2 (610). In this sequence, the home device 1 can complete the process of switching the video call channel with the first smart device 51 into a video call with the second smart device 52.

Figure 5:
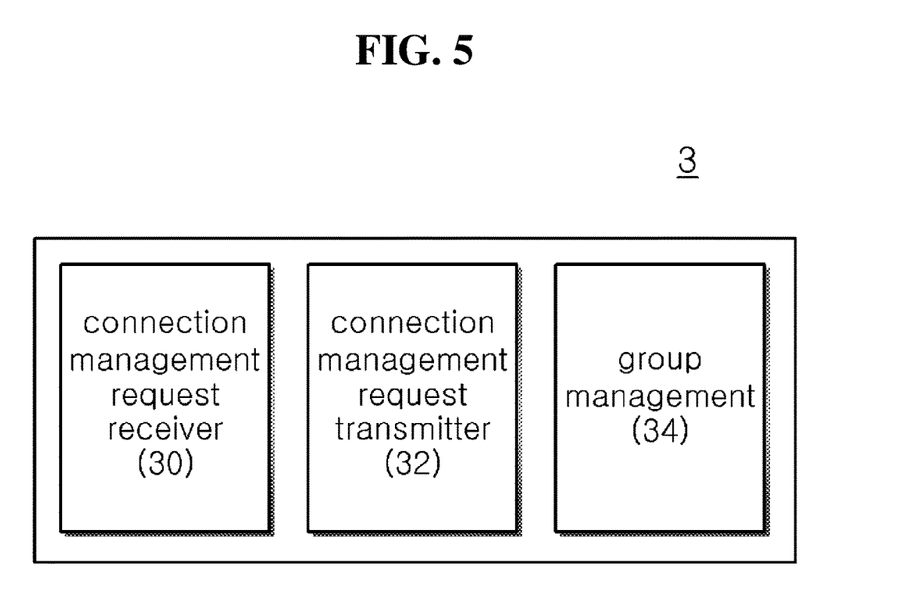
FIG. 5 is a block diagram illustrating an example of a connection management server.

FIG. 5 is a block diagram illustrating an example of a connection management server. As shown in FIG. 5, the connection management server 3 can include a connection management request receiver 30, a connection management request transmitter 32, and a group manager 34. The connection management server 3 can be connected to a signaling server, a push server, at least one home device, and a plurality of smart devices.

The connection management request receiver 30 can receive a video call connection request from the home device, a video call connection request from the smart device, a user switching request from the home device, and/or a user switching request from a smart device for a switch to another smart device. When the video call connection between the home device and the smart device is to be released, the connection management request transmitter 32 can transmit connection state release requests to the home device and the smart device connected to the home device.

When the home device or the smart device requests a video call connection, the connection management request transmitter 32 can transmit a request for a push notification transmission for a video call to the push server. Upon request for switching users, the connection management request transmitter 32 can transmit a request for a push notification transmission for switching users. The group manager 34 can manage, in a group, the smart device IDs of smart devices receiving push notifications to be sent from the push server. Managing the smart device IDs in a group enables integrated management of a plurality of smart devices in device groups. In various embodiments, a plurality of device groups can exist, and a single smart device can belong to a plurality of device groups.

A method and system for switching a push-based video call between devices in a group can also be implemented. In some embodiments, functions such as user switching and states notification that were provided by the conventional connection type home device can also be implemented in the remote communication between a home device and a smart device, and thus it is possible to improve the user's convenience in the environment of 1:N capable of connecting a plurality of smart devices to one home device.

While the embodiments of the present disclosure have been described with reference to the accompanying drawings, it will be appreciated by those skilled in the art that other detailed embodiment may be performed without departing from the spirit and scope of the present disclosure. Therefore, it should be understood that the present disclosure is illustrative and not limiting. The scope of the present disclosure is defined by the following claims rather than the detailed description and all changes or modifications derived from the meaning and scope of the claims and their equivalents are to be construed as being included within the scope of the present disclosure.

As will be appreciated by one skilled in the art, aspects of the present inventive concept may be embodied as a system, method or computer program product. Accordingly, aspects of the present inventive concept may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive concept may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive concept may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive concept are described with reference to flowchart illustrations and/or block diagrams of methods, apparatus (systems) and computer program products according to embodiments of the inventive concept. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present inventive concept. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The storage unit may include commands executed by the processor to enable the processor to perform a predetermined operation that may include at least one of receiving, by the connection management server, a user switching request from one of the home device and a first smart device between which a video call connection is established, transmitting a user switching push notification transmission request to the push server in response to receiving the user switching request, receiving a user switching response from a second smart device, and transmitting a connection releasing request to the home device and the first smart device in response to receiving the user switching response.

The storage unit may include commands executed by the processor to enable the processor to perform a predetermined operation that may include at least one of receiving, by the connection management server, a smart device ID of the second smart device from the device transmitting the user switching request, requesting, by the connection management server, the push server to transmit a push notification to a group including at least a smart device having the smart device ID, and requesting, by the connection management server, the push server to transmit a push notification to a smart device having the smart device ID.

What is claimed is:

1. A connection management server for switching a push-based video call between devices in a group, the connection management server connected to a signaling server, a push server, at least one home device, and at least two smart devices, the connection management server comprising:
   a connection management request receiver configured to receive a video call connection request from one of the home device and a first smart device of the at least two smart devices and configured to receive a user switching request from one of the home device and the first smart device of the at least two smart devices;
   a connection management request transmitter configured to transmit a connection state releasing request to the home device and the first smart device, configured to transmit a video call push notification transmission request to the push server upon the video call connection request, and configured to transmit a user switching push notification transmission request to the push server upon the user switching request; and
   a group manager configured to manage, in a group, smart device identity (ID) corresponding to a push notification sent from the push server,
   wherein upon receiving the user switching request from one of the home device and the first smart device, the connection management server is configured to receive a smart device ID of a second smart device of the at least two smart devices, and
   wherein upon receiving the smart device ID, the ;push server is configured to transmit a push notification to a group including the at least two smart devices having the smart device ID.

2. The connection management server of claim 1, wherein upon receiving the smart device ID, the push server is configured to transmit a push notification to a smart device having the smart device ID.

3. A method of switching a push-based video call between devices in a group in a connection management server connected to a signaling server, a push server, at least one home device, and at least two smart devices, the method comprising:
   receiving, by the connection management server, a user switching request from one of the home device and a first smart device of the at least two smart devices between which a video call connection is established;
   transmitting a user switching push notification transmission request to the push server in response to receiving the user switching request;
   receiving a user switching response from a second smart device of the at least two smart devices;
   transmitting a connection releasing request to the home device and the first smart device in response to receiving the user switching response;
   receiving, by the connection management server, a smart device ID of the second smart device from the home device or the first smart device transmitting the user switching request; and
   requesting, by the connection management server, the push server to transmit a push notification to a group including at least two smart devices having the smart device ID.

4. The method of claim 3, further comprising requesting, by the connection management server, the push server to transmit a push notification to a smart device having the smart device ID.

5. The method of claim 3, further comprising managing, by a group manager, the smart device ID of the at least two smart devices corresponding to the user switching push notification transmission request.

* * * * *